United States Patent
Hung et al.

(10) Patent No.: US 10,165,248 B2
(45) Date of Patent: Dec. 25, 2018

(54) OPTIMIZATION METHOD OF IMAGE DEPTH INFORMATION AND IMAGE PROCESSING APPARATUS

(71) Applicant: Altek Semiconductor Corp., Hsinchu (TW)

(72) Inventors: Shuo-Tse Hung, Hsinchu (TW); Yun-Chin Li, Hsinchu (TW); Wen-Yan Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 220 days.

(21) Appl. No.: 15/408,421

(22) Filed: Jan. 18, 2017

(65) Prior Publication Data
US 2018/0115763 A1    Apr. 26, 2018

(30) Foreign Application Priority Data
Oct. 20, 2016  (TW) .............................. 105133841 A

(51) Int. Cl.
*H04N 13/00*    (2018.01)
*H04N 13/128*   (2018.01)
*H04N 13/156*   (2018.01)

(52) U.S. Cl.
CPC ......... *H04N 13/128* (2018.05); *H04N 13/156* (2018.05)

(58) Field of Classification Search
CPC .......................... H04N 13/128; H04N 13/156

USPC ......................................................... 348/46
See application file for complete search history.

(56) References Cited

U.S. PATENT DOCUMENTS

| 2014/0119656 A1* | 5/2014 | Lilje | G06T 7/12 |
| | | | 382/173 |
| 2015/0003725 A1* | 1/2015 | Wan | G06T 7/194 |
| | | | 382/154 |
| 2015/0139533 A1* | 5/2015 | Wu | G06K 9/00362 |
| | | | 382/154 |

FOREIGN PATENT DOCUMENTS

CN        105517677        4/2016

* cited by examiner

*Primary Examiner* — Allen C Wong
(74) *Attorney, Agent, or Firm* — JCIPRNET

(57) ABSTRACT

An optimization method of image depth information and an image processing apparatus are provided. A to-be-repaired depth map generated based on a left image and a right image is obtained. A superpixel segmenting process is performed on the left image or the right image to obtain multiple superpixels. A plurality of image segments are obtained by aggregating the superpixels according to pixel information in the superpixels. A hole filling process is performed on holes of the to-be-repaired depth map to obtain a hole-filled depth map. A statistical analysis is performed on first valid depth values of the to-be-repaired depth map and second valid depth values of the hole-filled depth map to obtain a plurality of optimized depth values by using the ranges of the image segments, the ranges of the superpixels, the to-be-repaired depth map, and the hole-filled depth map.

26 Claims, 8 Drawing Sheets

OPTIMIZATION METHOD OF IMAGE DEPTH INFORMATION AND IMAGE PROCESSING APPARATUS

CROSS-REFERENCE TO RELATED APPLICATION

This application claims the priority benefit of Taiwan application serial no. 105133841, filed on Oct. 20, 2016. The entirety of the above-mentioned patent application is hereby incorporated by reference herein and made a part of this specification.

BACKGROUND OF THE INVENTION

[Field of the Invention]

The invention relates to a method and an apparatus for processing images, and particularly relates to a method and an apparatus for optimizing depth information.

[Description of Related Art]

With the rapid development of image processing technology, stereo vision technology has been widely used in various fields. Broadly speaking, stereo vision includes two stages. The first stage includes generating depth information by using a depth camera or a stereo camera or using relevant three-dimensional imaging algorithms. The following stage is to generate images from different perspectives based on the depth information. Therefore, accurate depth information is very important for generating stereo images that create better visual experience.

According to the current technology, a preliminary smoothing process may be applied on the depth map to improve the accuracy of the depth map. However, due to limited reference information and inadequate algorithm complexity, simply using neighboring blocks to adjust the depth information may result in more errors. Particularly, in a large non-textured region, the depth value information for reference may have an overly large difference and make it difficult to distinguish the depth values of the background region and the object region. Moreover, in the case where the background and the foreground are similar, the depth value of the object region may be affected by the depth rendering near the background, which results in generation of a depth map with poor accuracy. In other words, different depth information generation algorithms may render accuracy and calculation differently. Thus, how to generate accurate depth information under allowable calculation and complexity and improve the quality of the three-dimensional images generated based on the depth information is an issue that needs to be addressed.

SUMMARY OF THE INVENTION

In view of the above, the invention provides an optimization method of image depth information and an image processing apparatus for improving an erroneous deviation of the image depth information caused by characteristics of a non-textured region and thereby enhancing accuracy of the depth information.

The invention provides an optimization method of image depth information, adapted for an image processing apparatus. The optimization method includes the following. First, a to-be-repaired depth map generated based on a left image and a right image is obtained. The to-be-repaired depth map records a plurality of first valid depth values and a plurality of holes, wherein the plurality of holes are corresponding to a plurality of invalid depth values and distributed over the to-be-repaired depth map. A superpixel segmenting process is performed on one of the left image and the right image to obtain a plurality of superpixels of one of the left image and the right image. The superpixels are aggregated according to pixel information in the superpixels to obtain a plurality of image segments. A hole filling process is performed on the holes in the to-be-repaired depth map, so as to obtain a hole-filled depth map that includes a plurality of second valid depth values. Then, a statistical analysis is performed on the first valid depth values of the to-be-repaired depth map and the second valid depth values of the hole-filled depth map by using a range divided by the image segments, a range divided by the superpixels, the to-be-repaired depth map, and the hole-filled, depth map, so as to obtain a plurality of optimized depth values. Thereafter, an optimized depth map is obtained according to the optimized depth values.

From another aspect, the invention provides an image processing apparatus, which includes a storage device recording a plurality of modules and one or more processors. The processor is coupled to the storage device and accesses and executes the modules recorded in the storage device, and the modules include a to-be-repaired depth map obtaining module, a superpixel segmenting module, an image segmenting module, a hole filling module, a depth optimizing module, and a depth map generating module. The to-be-repaired depth map obtaining module obtains a to-be-repaired depth map generated based on a left image and a right image. The to-be-repaired depth map records a plurality of first valid depth values and a plurality of holes, wherein the plurality of holes are corresponding to a plurality of invalid depth values and distributed over the to-be-repaired depth map. The superpixel segmenting module performs a superpixel segmenting process on one of the left image and the right image to obtain a plurality of superpixels of one of the left image and the right image. The image segmenting module aggregates the superpixels according to pixel information in the superpixels to obtain a plurality of image segments. The hole filling module performs a hole filling process on the holes in the to-be-repaired depth map to obtain a hole-filled depth map that includes a plurality of second valid depth values. The depth optimizing module performs a statistical analysis on the first valid depth values of the to-be-repaired depth map and the second valid depth values of the hole-filled depth map by using a range divided by the image segments, a range divided by the superpixels, the to-be-repaired depth map, and the hole-filled depth map, so as to obtain a plurality of optimized depth values. The depth map generating module obtains an optimized depth map according to the optimized depth values.

Based on the above, in the embodiments of the invention, superpixel segmentation is performed on one of the left image and the right image first to obtain a plurality of superpixels, and adjacent superpixels are aggregated according to the pixel information in each superpixel, so as to obtain a plurality of image segments. According to the invention, the to-be-repaired depth map is divided into a plurality of to-be-repaired segment blocks according to the range divided by the image segments. Based on the range divided by the image segments and the range divided by the superpixels, the hole-filled depth map is respectively divided into a plurality of hole filling segment blocks and a plurality of superpixel blocks. Thus, an unreliable region, which is a block needs to be optimized, including unreliable depth values can be identified according to the statistical information of the depth information in the to-be-repaired segment blocks. Moreover, according to the invention, optimized depth values are generated for the unreliable region by using the statistical information of the depth information in the to-be-repaired segment blocks, the statistical information of the depth information n the hole filling segment blocks, and the statistical information of the depth information in the superpixel blocks. Accordingly, the optimized depth values are filled into the holes in the unreliable region to generate the optimized depth map, thereby improving the accuracy of the depth information.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
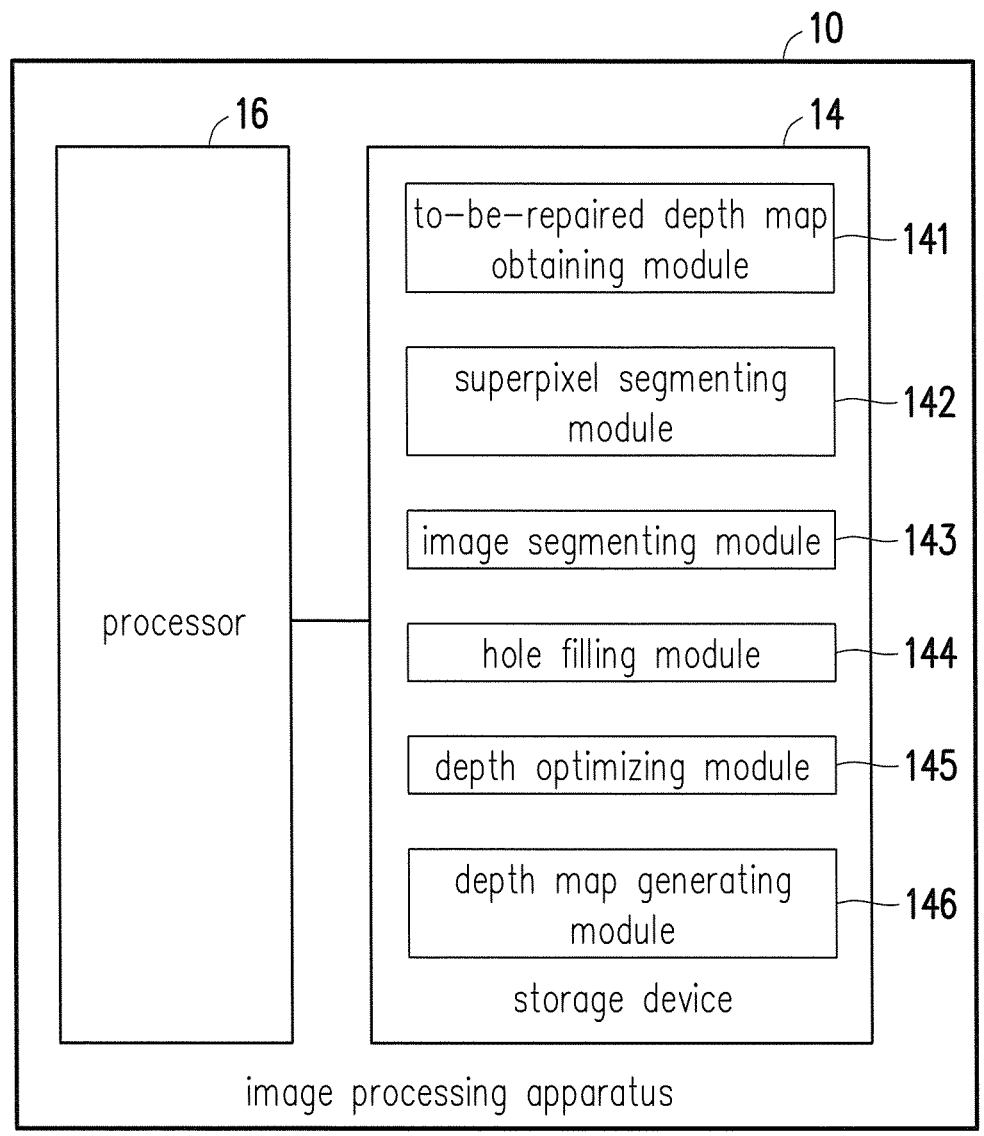
FIG. 1 is a block diagram illustrating an image processing apparatus according to an embodiment of the invention.

Some embodiments of the invention are described in detail hereinafter with reference to the drawings. Regarding the reference numerals mentioned in the following description, the same reference numerals in different drawings are deemed to represent the same or similar components. These embodiments are only part of the invention. Not all possible embodiments are disclosed here in this specification. More precisely, these embodiments are merely examples of the apparatus and method defined by the scope of the invention.

FIG. 1 is a block diagram illustrating an image processing apparatus according to an embodiment of the invention. Referring to FIG. 1, an image processing apparatus 10 of this embodiment is a computer apparatus that has image processing capability, such as a digital camera, a mobile phone, a tablet computer, a desktop computer, a laptop computer, and a stereo camera including a stereo imaging system (not shown), but not limited thereto. That is, the image processing apparatus 10 may be an image capturing apparatus that includes the stereo imaging system. Moreover, the image processing apparatus 10 may be an electronic device coupled to the image capturing apparatus that includes the stereo imaging system. Nevertheless, the disclosure is not intended to limit the type of the image processing apparatus 10. The image processing apparatus 10 includes a storage device 14 and one or more processors (which is a processor 16 in this embodiment, for example, but not limited thereto). Functions thereof are described as follows.

The storage device 14 is a stationary or movable random access memory (RAM) in any form, a read-only memory (ROM), a flash memory, a hard disc, other similar devices, or a combination of the foregoing, for example, for storing data and a plurality of modules. The aforementioned modules include a to-be-repaired depth map obtaining module 141, a superpixel segmenting module 142, an image segmenting module 143, a hole filling module 144, a depth optimizing module 145 and a depth map generating module 146. The modules are computer programs, for example, which are loaded into the processor 16 to execute functions of generating depth information. In other words, the processor 16 is coupled to the storage device 14 for executing the modules, so as to control the image processing apparatus 10 to execute functions of generating and optimizing the depth information. The processor 16 may be a central processing unit (CPU), a microprocessor, an application specific integrated circuit (ASIC), a programmable logic device (PLD), or other hardware devices with computing capability, for example.

Figure 2:
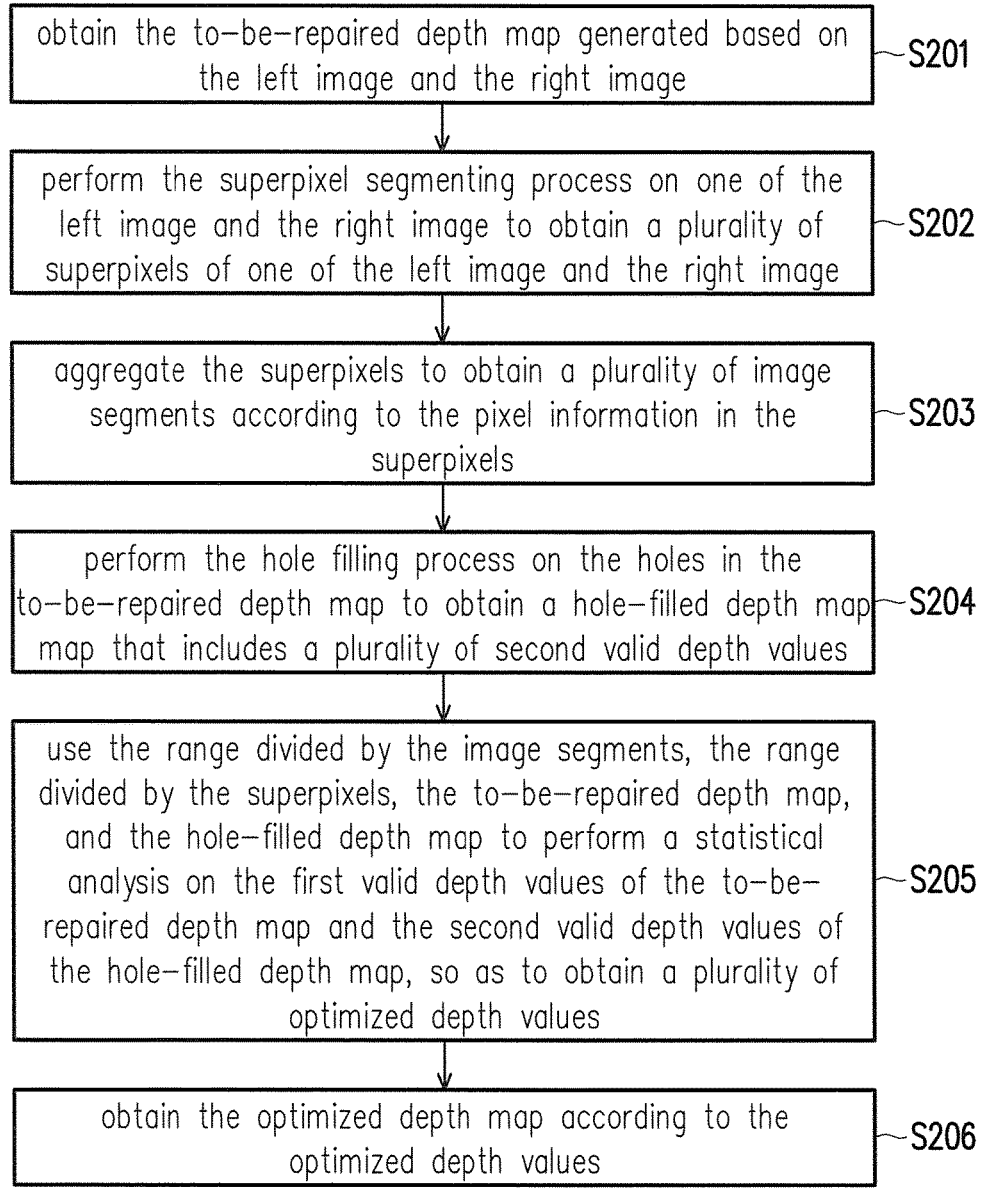
FIG. 2 is a flowchart illustrating an optimization method of image depth information according to an embodiment of the invention.

FIG. 2 is a flowchart illustrating an optimization method of image depth information according to an embodiment of the invention. The method of FIG. 2 is adapted for the image processing apparatus 10 of FIG. 1. Hereinafter, steps of a method of generating the depth information in this embodiment are described in detail with reference to the components of the image processing apparatus 10. Please refer to FIG. 1 and FIG. 2.

It should be noted that, in an embodiment, the stereo imaging system includes two image sensing modules, which include a left image sensing module and a right image sensing module depending on where the lenses are located. Accordingly, the left image sensing module and the right image sensing module may simultaneously capture images (left image and right image) of the same scene from different perspectives. By calculating disparity between pixels of the left image and pixels of the right image, a plurality of depth values are estimated based on the aforementioned disparity, the lens focal length, and a distance between the left image sensing module and the right image sensing module. The depth values corresponding to a plurality of pixel coordinates constitute an original depth map.

In Step S201, a to-be-repaired depth map obtaining module 141 obtains a to-be-repaired depth map generated based on the left image and the right image. Here, the to-be-repaired depth map records a plurality of first valid depth values and a plurality of holes, wherein the holes are corresponding to a plurality of invalid depth values and distributed over the to-be-repaired depth map. To be more specific, based on various determination mechanisms, the depth values on the original depth map are identified as the first valid depth values or the invalid depth values. For instance, the to-be-repaired depth map obtaining module 141 determines whether each depth value is one invalid depth value by analyzing each depth value and the depth information around each depth value. Nevertheless, the disclosure is not intended to limit how the invalid depth values are identified. Thereafter, the to-be-repaired depth map having a plurality of holes thereon is generated by removing the invalid depth values from the original depth map.

In Step S202, a superpixel segmenting module 142 performs a superpixel segmenting process on one of the left image and the right image, so as to obtain a plurality of superpixels of one of the left image and the right image. To be more specific, the left image includes a plurality of left pixels and the right image includes a plurality of right pixels. The superpixel segmenting module 142 may select the left image or the right image for performing the superpixel segmenting process. The disclosure is not intended to limit which image is processed. In the following description, the superpixel segmenting process is performed on the left image, for example. The superpixel segmenting module 142 performs the superpixel segmenting process according to a color performance, a geometric characteristic, and the preset number of the superpixels of the left image. In other words, the superpixel segmenting module 142 divides the left pixels into a plurality of superpixels according to a pixel value and a pixel location of each left pixel. That is, each superpixel is an aggregation of multiple left pixels.

In an embodiment, each superpixel includes more than one left pixel. In an embodiment, the pixels in the same superpixel have substantially the similar color, and the left pixels in the same superpixel are adjacent to one another. For example, the superpixel segmenting module 142 calculates RGB chrominance components of the left pixels to obtain the pixel values of the left pixels on different chrominance channels. Likewise, the superpixel segmenting module 142 may also calculate the brightness (Y) and chrominance components (Cb, Cr) of the left pixels to obtain the pixel values of the left pixels on a brightness channel or the chrominance channel. The superpixel segmenting module 142 generates a pixel value difference by comparing the pixel values of adjacent left pixels and decides whether to connect two adjacent left pixels according to the pixel value difference between the two adjacent left pixels. If the pixel value difference between the two adjacent left pixels is less than a difference threshold value, the two adjacent left pixels are divided into the same superpixel.

Figure 3A:
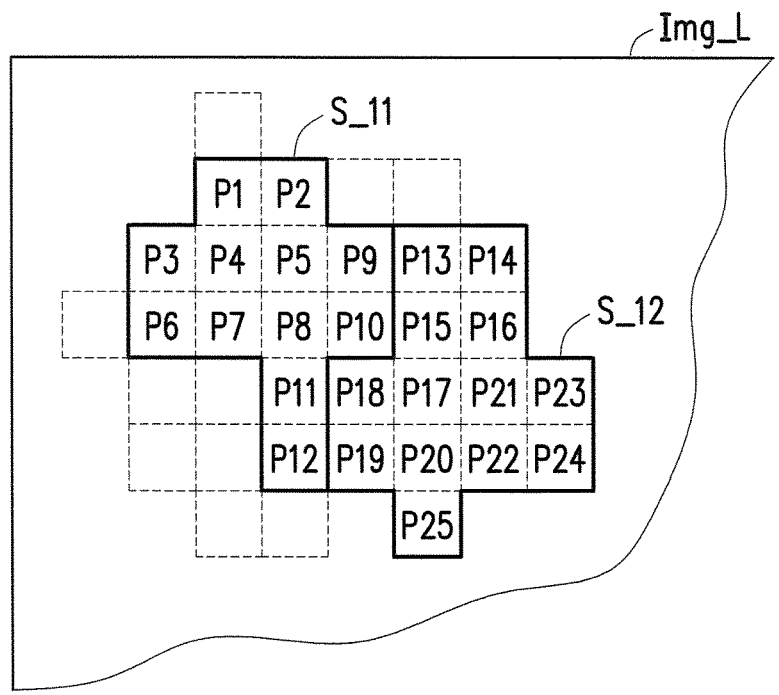
FIG. 3A is a diagram illustrating an example of the superpixel according to an embodiment of the invention.

For instance, FIG. 3A is a diagram illustrating an example of the superpixel according to an embodiment of the invention. Referring to FIG. 3A, it is assumed that a left image Img_L includes pixels P1 to P25. In this example, the pixels P1 to P12 are divided into a superpixel S_11 because of similar pixel values while the pixels P3 to P25 are divided into a superpixel S_12 because of similar pixel values. As shown in FIG. 3A, because the pixel value difference between the pixel P1 and the pixel P2 is less than the difference threshold value, the superpixel segmenting module 142 connects and associates the pixel P1 and the pixel P2. Likewise, because the pixel value difference between the pixel P9 and the pixel P13 is not less than the difference threshold value, the superpixel segmenting module 142 does not connect the pixel P9 and the pixel P13. Nevertheless, the disclosure is not intended to limit the actual segmenting method of the superpixel segmenting process, which may be decided by those skilled in the art according to the actual needs.

Next, in Step S203, an image segmenting module 143 aggregates the superpixels to obtain a plurality of image segments according to the pixel information in the superpixels. In other words, each of the aforementioned image segments is an aggregation of multiple superpixels. To be more specific, by comparing the pixel information between two adjacent superpixels, the image segmenting module 143 decides whether to connect two adjacent superpixels to generate the image segment. In an embodiment, the image segmenting module 143 combines adjacent superpixels to obtain the image segment with a larger range according to an edge characteristic or histogram information of each superpixel.

In an embodiment, the image segmenting module 143 may collect statistics of the histogram information of each superpixel. The aforementioned histogram information is generated from the statistics of the pixel value information of each pixel in one superpixel, which may be a HSV histogram or a statistical chrominance histogram corresponding to each color channel, for example, but the invention is not limited thereto. Then, the image segmenting module 143 combines the adjacent superpixels to form the image segment according to the histogram information of each superpixel. To be more specific, the image segmenting module 143 determines whether two adjacent superpixels have similar histogram information, so as to decide whether to divide the two adjacent superpixels into the same image segment.

In an embodiment, the image segmenting module 143 performs edge detection on the superpixels to obtain the edge characteristic of each superpixel. In other words, by performing the edge detection on each pixel, the image segmenting module 143 identifies an image edge in each superpixel. Thereafter, the image segmenting module 143 combines the adjacent superpixels to form the image segment according to the edge characteristic of each superpixel. Furthermore, the image segmenting module 143 determines whether the image edges of two adjacent superpixels are connected with each other, so as to decide whether to divide the two adjacent superpixels into the same image segment.

Figure 3B:
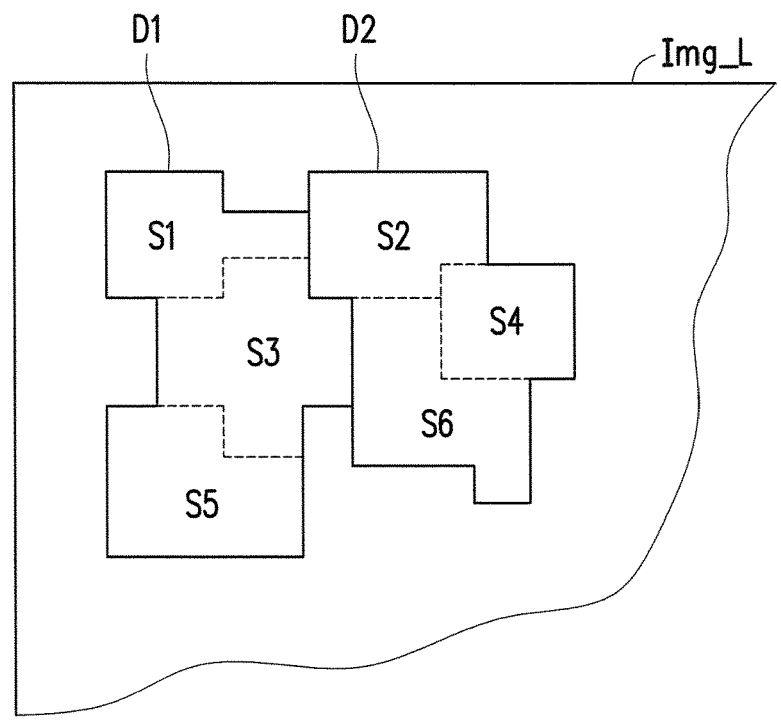
FIG. 3B is a diagram illustrating an example of the superpixel and the image segment according an embodiment of the invention.

FIG. 3B is a diagram illustrating an example of the superpixel and the image segment according an embodiment of the invention. Referring to FIG. 3B, it is assumed that the left image Img_L includes superpixels S1 to S6. In this example, the superpixels S1, S3, and S5 each including multiple pixels are divided into an image segment D1 based on the respective pixel information thereof, and the superpixels S2, S4, and S6 each including multiple pixels are divided into an image segment D2 based on the respective pixel information thereof. As shown in FIG. 3B, because the superpixel S1 and the superpixel S3 have similar histogram information, the superpixel segmenting module 142 connects the superpixel S1 and the superpixel S3. Likewise, because the superpixel S1 and the superpixel S2 do not have similar histogram information, the superpixel segmenting module 142 does not connect the superpixel S1 and the superpixel S2.

Next, in Step S204, the hole filling module 144 performs a hole filling process on the holes in the to-be-repaired depth map, so as to obtain a hole-filled depth map that includes a plurality of second valid depth values. To be more specific, the hole filling module 144 generates a hole filling depth value for filling each hole according to the depth information around each hole. Therefore, the hole-filled depth map records the second valid depth values respectively corresponding to the left pixels. Here, the depth values respectively corresponding to all the left pixels on the hole-filled depth map are referred as the second valid depth values.

In an embodiment, the hole filling module 144 obtains the first valid depth values adjacent to each hole on the to-be-repaired depth map by using a preset mask. Then, the hole filling module 144 calculates a plurality of hole filling depth values corresponding to the holes according to the first valid depth values adjacent to each hole, and fills the hole filling depth value corresponding to each hole to the to-be-repaired depth map, so as to obtain the hole-filled depth map that records a plurality of second valid depth values.

In Step S205, a depth optimizing module 145 uses the range divided by the image segments, the range divided by the superpixels, the to-be-repaired depth map, and the hole-filled depth map to perform a statistical analysis on the first valid depth values of the to-be-repaired depth map and the second valid depth values of the hole-filled depth map, so as to obtain a plurality of optimized depth values. That is, according to the statistical information obtained by performing the statistical analysis on the first valid depth values of the to-be-repaired depth map and the second valid depth values of the hole-filled depth map, the depth optimizing module 145 generates optimized depth values corresponding to all or part of the holes on the to-be-repaired depth map. It should be noted that the range divided by the image segments may respectively segment the to-be-repaired depth map or the hole-filled depth map into a plurality of segment blocks. Here, the segment blocks on the to-be-repaired depth map are referred as to-be-repaired segment blocks while the segment blocks on the hole-filled depth map are referred as hole filling segment blocks. The to-be-repaired segment blocks correspond to the hole filling segment blocks on a one-to-one basis according to the locations of the blocks. In addition, the range divided by the superpixels may segment the hole-filled depth map into a plurality of superpixel blocks. Therefore, the depth optimizing module 145 collects statistics and performs analysis on the first valid depth values or the second valid depth values in a specific range, and obtains the optimized depth values corresponding to different pixel locations accordingly. At last, in Step S206, a depth map generating module 146 obtains an optimized depth map according to the optimized depth values.

Figure 4:
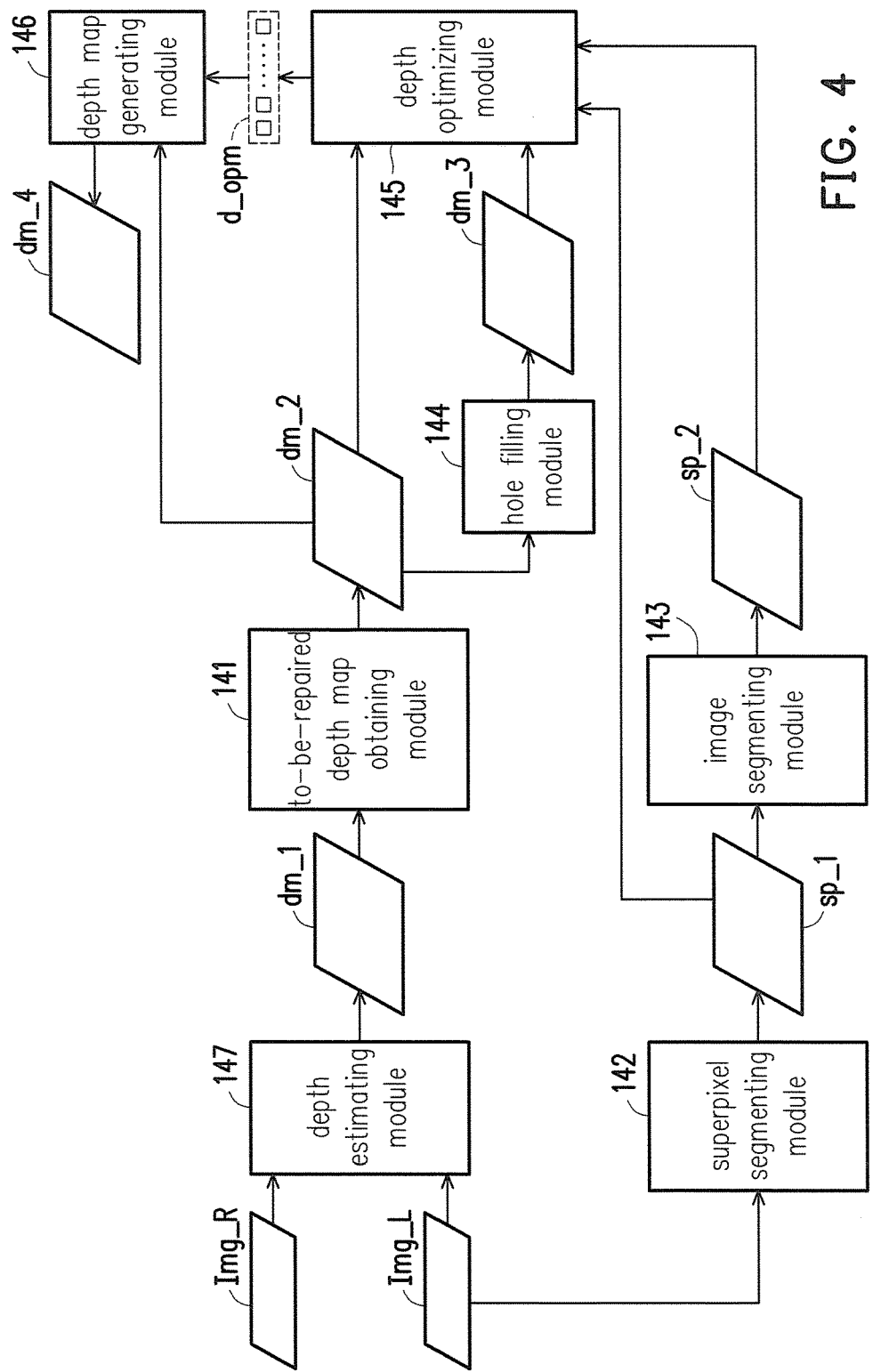
FIG. 4 is an operation diagram illustrating the optimization method of the image depth information according to an embodiment of the invention.

To more clearly explain the invention, FIG. 4 is an operation diagram illustrating the optimization method of the image depth information according to an embodiment of the invention. Referring to FIG. 4, the depth estimating module 147 receives the left image Img_L and the right image Img_R captured by the stereo imaging system. The depth estimating module 147 performs a three-dimensional depth estimation on the left image Img_L and the right image Img_R to obtain the original depth map dm_1. Then, the to-be-repaired depth map obtaining module 141 determines whether each original depth value on the original depth map dm_1 is an invalid depth value and removes the invalid depth value from the original depth map dm_1 to obtain the to-be-repaired depth map dm_2. The to-be-repaired depth map dim records a plurality of first valid depth values, and a plurality of holes corresponding to a plurality of invalid depth values are distributed over the to-be-repaired depth map dm_2.

The hole filling module 144 respectively generates a plurality of hole filling depth values for the holes of the to-be-repaired depth map dm_2, and fills the hole filling depth values to the to-be-repaired depth map dm_2 to generate the hole-filled depth map dm_3. Thus, the hole-filled depth map dm_3 records a plurality of second valid depth values. In addition, the superpixel segmenting module 142 performs the superpixel segmenting process on the left image Img_L to obtain the superpixel map SP_1 that includes a plurality of superpixels. According to the pixel information in each superpixel on the superpixel map SP_1, the image segmenting module 143 aggregates the superpixels into a plurality of image segments to obtain the image segment map SP_2. Details of the superpixel segmenting process and the aggregation of the superpixels have been specified in the above embodiment and thus are not repeated hereinafter.

Then, the depth optimizing module 145 performs a regional statistical analysis on the first valid depth values of the to-be-repaired depth map dm_2 and the second valid depth values of the hole-filled depth map dm_3 by using the image segments on the image segment map SP_2, the superpixels on the superpixel map SP_1, the to-be-repaired depth map dm_2, and the hole-filled depth map dm_3, so as to obtain a plurality of optimized depth values d_opm.

In an embodiment, the depth optimizing module 145 segments the to-be-repaired depth map dm_2 or the hole-filled depth map dm_3 into a plurality of segment blocks according to the range divided by the image segments. Here, the segment blocks on the to-be-repaired depth map dm_2 are referred as to-be-repaired segment blocks while the segment blocks on the hole-filled depth map dm_3 are referred as hole filling segment blocks. Accordingly, the depth optimizing module 145 performs a statistical analysis on the first valid depth values in each to-be-repaired segment blocks on the to-be-repaired depth map dm_2 to obtain first statistical information. The first statistical information may include a statistical mean, a statistical standard deviation, a statistical mode, and so on of the first valid depth values in each segment block on the to-be-repaired depth map, but the invention is not limited thereto.

Likewise, the depth optimizing module 145 performs a statistical analysis on the second valid depth values in each hole filling segment block on the hole-filled depth map dm_3 to obtain second statistical information. The second statistical information may include a statistical mean, a statistical standard deviation, a statistical mode, and so on of the second valid depth values in each hole filling segment block on the hole-filled depth map dm_3, but the invention is not limited thereto. In addition, the range divided by the superpixels respectively segments the hole-filled depth map dm_3 into a plurality of superpixel blocks. Accordingly, the depth optimizing module 145 performs a statistical analysis on the second valid depth values in each superpixel block on the hole-filled depth map dm_3 to obtain third statistical information. The third statistical information may include a statistical mean, a statistical standard deviation, a statistical mode, and so on of the second valid depth values in each superpixel block on the hole-filled depth map, but the invention is not limited thereto. Thereafter, the depth optimizing module 145 obtains the optimized depth values d_opm according to the first statistical information, the second statistical information, and the third statistical information.

Then, the depth map generating module 146 obtains the optimized depth map dm_4 according to the optimized depth values d_opm. In this embodiment, the depth map generating module 146 fills the optimized depth values d_opm into the holes on the to-be-repaired depth map dm_2 to obtain the optimized depth map dm_4. In another embodiment, the depth map generating module 146 replaces the second valid depth values on the hole-filled depth map dm_3 with the optimized depth values d_opm to obtain the optimized depth map dm_4.

Figure 5A:
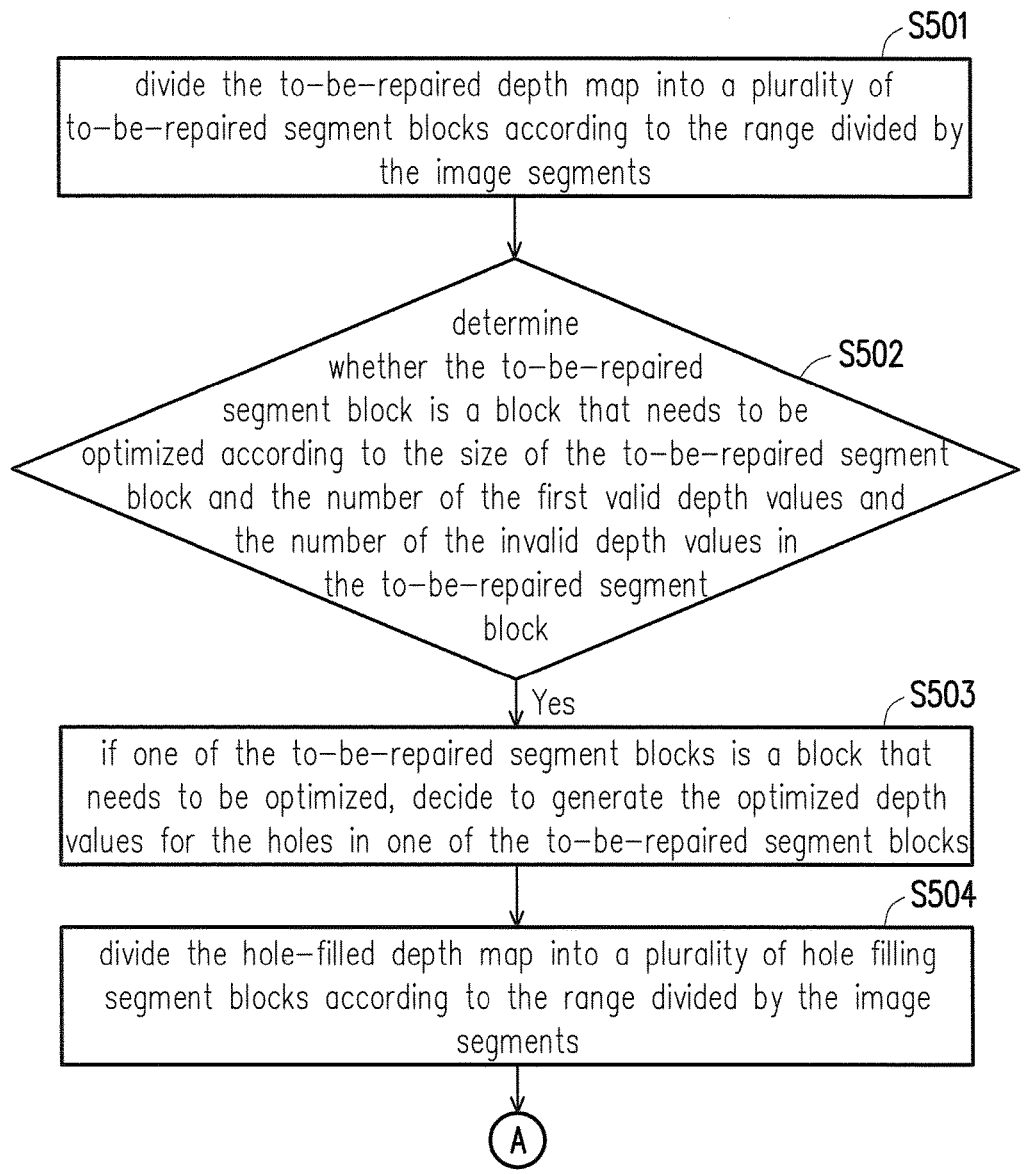
FIG. 5A, FIG. 5B and FIG. 5C are flowcharts illustrating generation of the optimized depth values according to an embodiment of the invention.
Figure 5B:
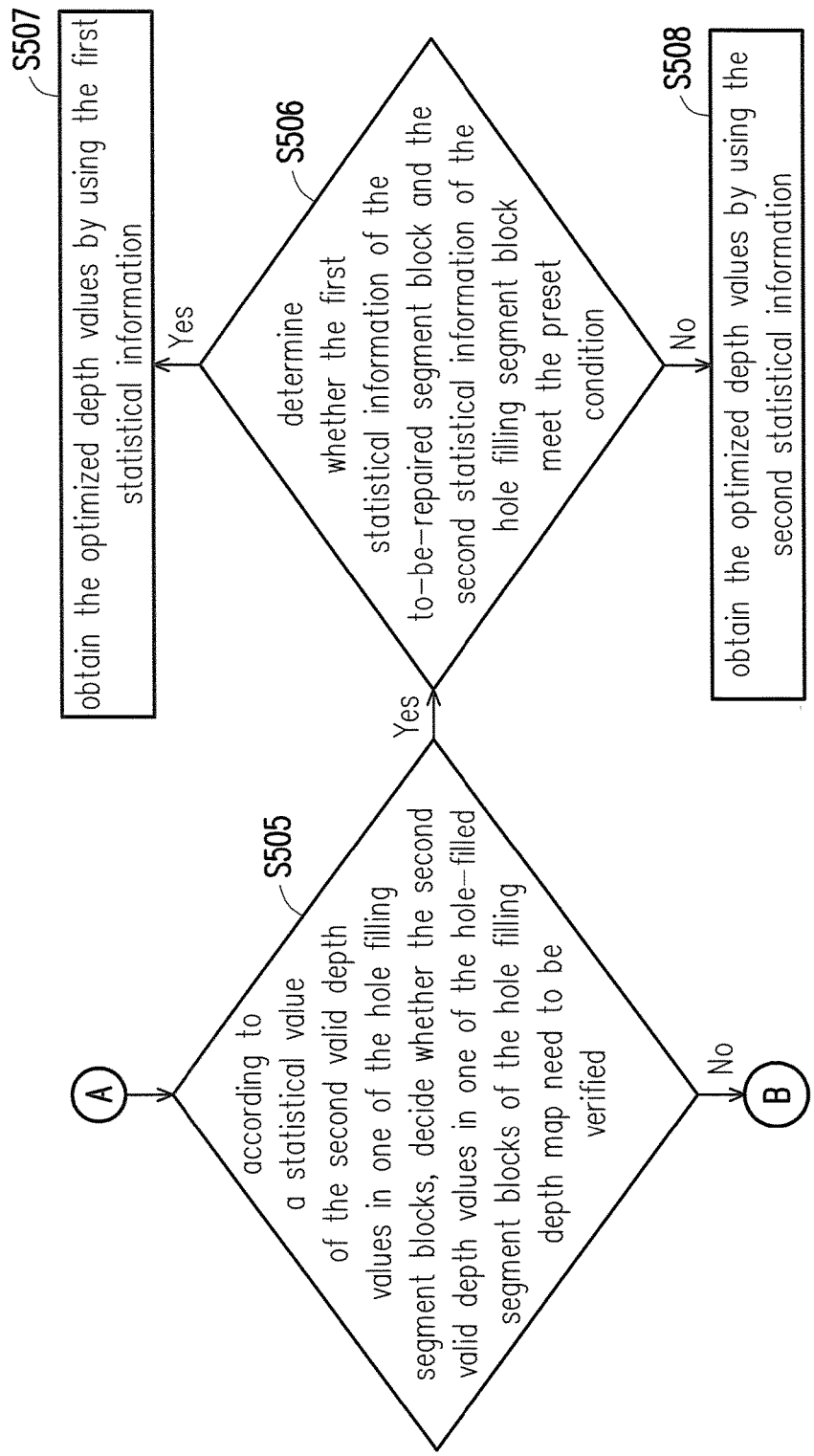
Figure 5C:
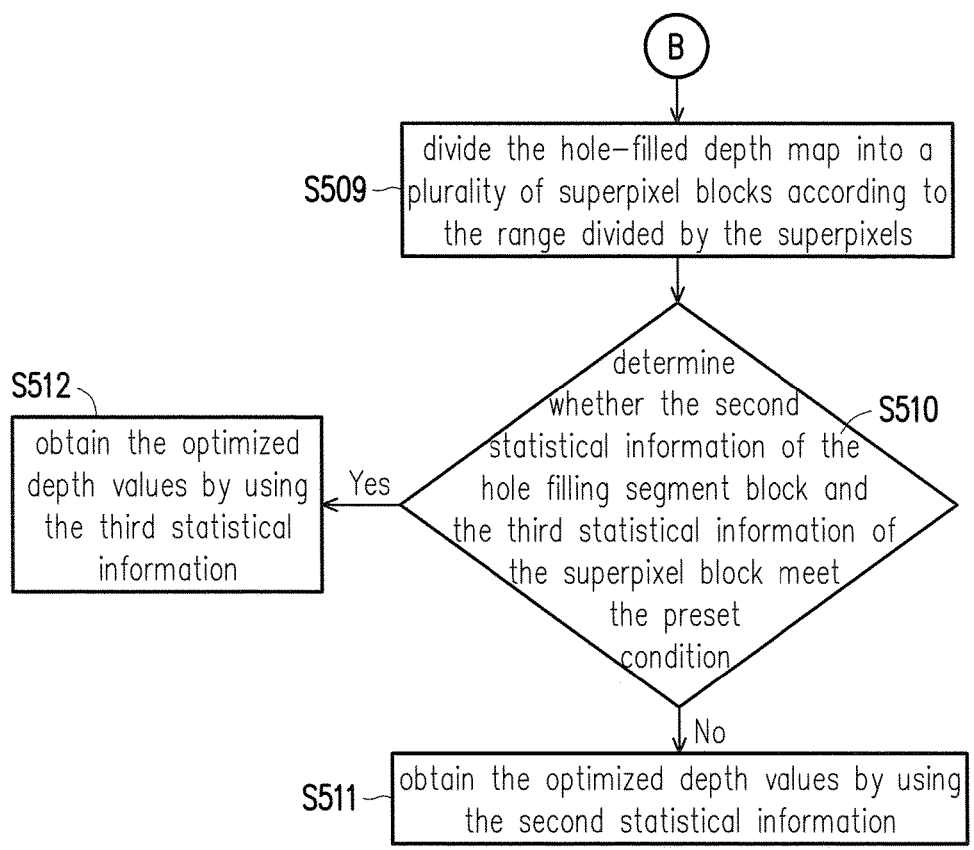

FIG. 5A, FIG. 5B and FIG. 5C are flowcharts illustrating generation of the optimized depth values according to an embodiment of the invention. Details regarding how to obtain the to-be-repaired depth map dm_2, the hole-filled depth map dm_3, the superpixel map SP_1, and the image segment map SP_2 have been specified in the above embodiment and thus are not repeated hereinafter. An embodiment is described hereinafter to explain how the depth optimizing module 145 generates the optimized depth values according to the first statistical information of the first valid depth values in the to-be-repaired segment blocks, the second statistical information of the second valid depth values in the hole filling segment blocks, and the third statistical information of the second valid depth values in the superpixel blocks. Please refer to FIG. 4, FIG. 5A to FIG. 5C.

Figure 6:
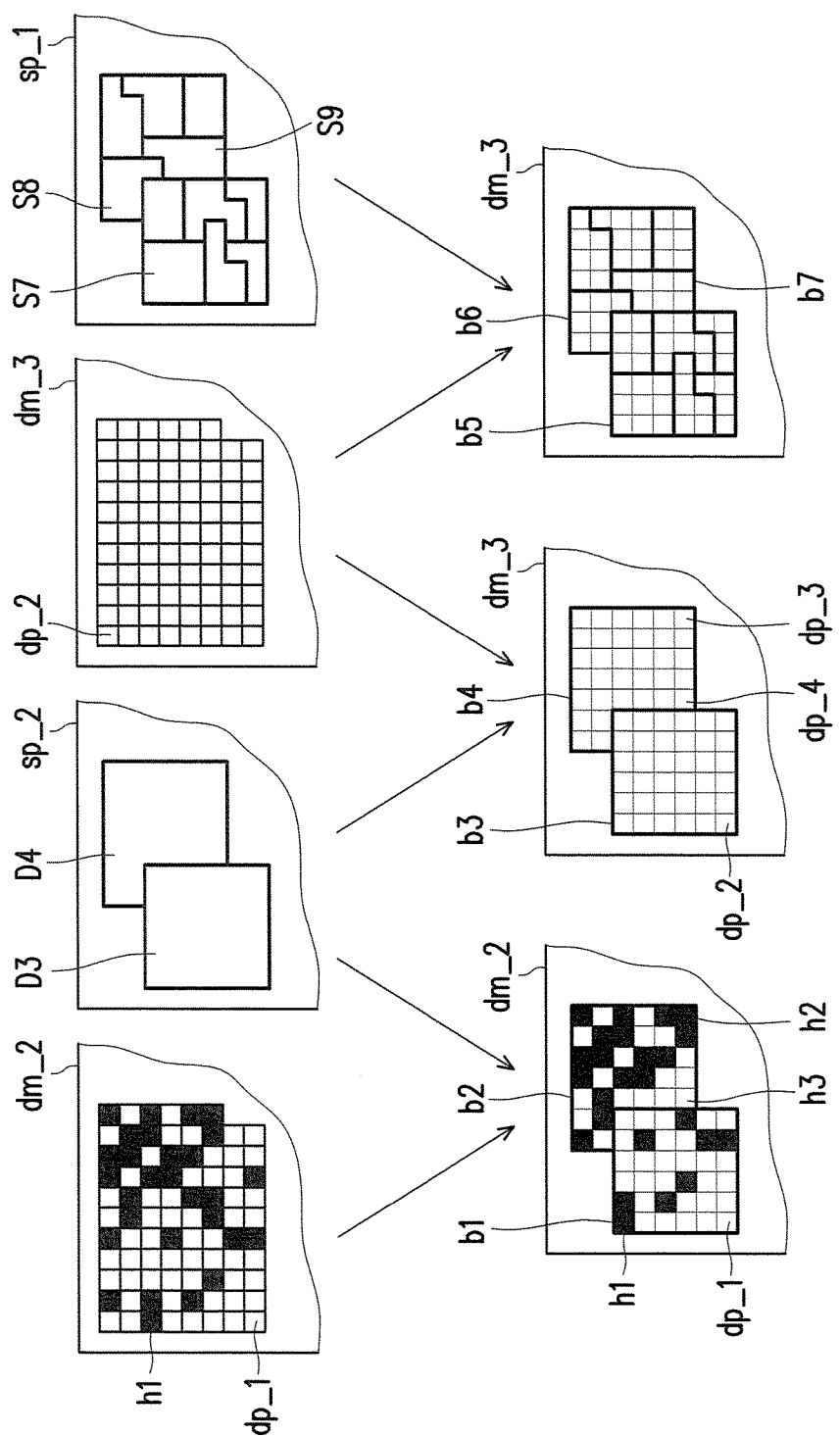
FIG. 6 is a diagram illustrating an example of generation of the optimized depth values according to an embodiment of the invention.

First, in Step S501, the depth optimizing module 145 divides the to-be-repaired depth map dm_2 into a plurality of to-be-repaired segment blocks according to the range divided by the image segments. In other words, based on the range divided by each image segment on the image segment map SP_2, the to-be-repaired depth map dm_2 is divided into a plurality of to-be-repaired segment blocks. Each to-be-repaired segment block includes a plurality of first valid depth values and holes corresponding to the invalid depth values. For instance, FIG. 6 is a diagram illustrating an example of generation of the optimized depth values according to an embodiment of the invention. Referring to FIG. 6, the to-be-repaired depth map dm_2 records a plurality of first valid depth values (e.g., first valid depth values dp_1), and a plurality of holes (e.g., holes h1) are distributed over the to-be-repaired depth map dm_2. The to-be-repaired depth map dm_2 is divided into the corresponding to-be-repaired segment block b1 and to-be-repaired segment block b2 according to the image segment D3 and the image segment D4 of the image segment map SP_2.

In Step S502, the depth optimizing module 145 determines whether the to-be-repaired segment block is a block that needs to be optimized according to a size of the to-be-repaired segment block and the number of the first valid depth values and the number of the invalid depth values in the to-be-repaired segment block. Accordingly, according to whether the to-be-repaired segment block is a block that needs to be optimized, the depth optimizing module 145 decides whether to generate the optimized depth values for the holes in the to-be-repaired segment block.

Specifically, if there is an excessive number of invalid depth values in the to-be-repaired segment block, the method of obtaining hole filling depth values based on adjacent information may result in a deviation due to insufficient reference information. Therefore, the depth optimizing module 145 determines whether the to-be-repaired segment block is an unreliable region, which is a block need to be optimized, according to the number of the invalid depth values. Alternatively, if the size of the to-be-repaired segment block is overly large, it indicates that the to-be-repaired segment block corresponds to a portion of insufficient texture information (e.g., a white wall) in the left image, and thus the method of obtaining the hole filling depth values based on adjacent information may result in distortion due to rendering of deviation calculation. Therefore, the depth optimizing module 145 determines whether the to-be-repaired segment block is the unreliable region according to the size of the to-be-repaired segment block. Referring to FIG. 6, for example, the depth optimizing module 145 determines whether the to-be-repaired segment block b1 is a block that needs to be optimized according to the size of the to-be-repaired segment block b1 and the number of the first valid depth values and the number of the invalid depth values in the to-be-repaired segment block b1.

In an embodiment, if the size of the to-be-repaired segment block is greater than a block threshold value and the number of the invalid depth values in the to-be-repaired segment block is greater than the number of the first valid depth values multiplied by a weighting factor, the depth optimizing module 145 determines that the to-be-repaired segment block is an unreliable region. The size of the to-be-repaired segment block may be defined as the number of pixels of the to-be-repaired segment block, and the block threshold value and the weighting factor may be designed according to the actual needs and are not particularly limited in the invention.

If one of the to-be-repaired segment blocks is a block that needs to be optimized (the determining result of Step S502 is YES), in Step S503, the depth optimizing module 145 decides to generate the optimized depth values for the holes in one of the to-be-repaired segment blocks. In the example of FIG. 6, if the size of the to-be-repaired segment block b2 is greater than the block threshold value and the number of the invalid depth values in the to-be-repaired segment block b2 is greater than the number of the first valid depth values multiplied by the weighting factor, the depth optimizing module 145 determines that the to-be-repaired segment block b2 is an unreliable region. The depth optimizing module 145 decides to generate the optimized depth values for the holes in the to-be-repaired segment block b2.

In Step S504, the depth optimizing module 145 divides the hole-filled depth map dm_3 into a plurality of hole filling segment blocks according to the range divided by the image segments. In other words, based on the range divided by each image segment on the image segment map SP_2, the hole-filled depth map dm_3 is divided into a plurality of hole filling segment blocks. Each hole filling segment block includes a plurality of second valid depth values. Referring to FIG. 6, for example, the hole-filled depth map dm_3 records a plurality of second valid depth values (e.g., second valid depth values dp_2). The hole-filled depth map dm_3 is divided into the corresponding hole filling segment block b3 and hole filling segment block b4 according to the image segment D3 and the image segment D4 of the image segment map SP_2. It should be noted that, based on the segmentation using the same image segment map SP_1, the to-be-repaired segment block b1 corresponds to the hole filling segment block b3 and the to-be-repaired segment block b2 corresponds to the hole filling segment block b4.

In Step S505, according to a statistical value of the second valid depth values in one of the hole filling segment blocks, the depth optimizing module 145 decides whether the second valid depth values in one of the hole filling segment blocks of the hole-filled depth map dm_3 need to be verified. The aforementioned statistical value is a statistical deviation or a statistical variance of the second valid depth values in one of the hole filling segment blocks. Specifically, the statistical information of the hole filling segment block corresponding to the to-be-repaired segment block determined as the block that needs to be optimized may be used for determining whether the second valid depth values need to be verified. Further, if the statistical deviation or the statistical variance of the second valid depth values of the hole filling segment block is overly large, it indicates that a phenomenon of mixture of the foreground depth and the background depth exists in this hole filling segment block. In other words, if the second valid depth values of the hole filling segment block have an overly large statistical deviation or statistical variance, it indicates that inaccurate second valid depth values exist in the hole filling segment blocks that should belong to the same plane depth. Therefore, if the second valid depth values of the hole filling segment block have an overly large statistical deviation or statistical variance, it indicates that the accuracy of the second valid depth values in the hole filling segment block need to be verified. According to whether the second valid depth values in one of the hole filling segment blocks need to be verified, the depth optimizing module 145 decides whether to generate the optimized depth values by using the second valid depth values in one of the hole filling segment blocks.

In the example of FIG. 6, for instance, it is assumed that the to-be-repaired segment block b2 is a block that needs to be optimized and the to-be-repaired segment block b2 corresponds to the hole filling segment block b4, and the depth optimizing module 145 performs a statistical operation on the second valid depth values in the hole filling segment block b4 to obtain the statistical deviation or statistical variance of the second valid depth values in the hole filling segment block b4. In an embodiment, if the statistical deviation or statistical variance of the second valid depth values in the hole filling segment block b4 is greater than a threshold value, the second valid depth values in the hole filling segment block b4 need to be verified. Therefore, the second valid depth values in the hole filling segment block b4 may not be suitable to be used for generating the optimized depth values. On the other hand, if the statistical deviation or statistical variance of the second valid depth values in the hole filling segment block b4 is not greater than the threshold value, the second valid depth values in the hole filling segment block b4 do not need to be verified. Therefore, the second valid depth values in the hole filling segment block b4 may be used for generating the optimized depth values.

If the second valid depth values in one of the hole filling segment blocks need to be verified (the determining result of Step S505 is YES), according to the first statistical information of the first valid depth values in one of the to-be-repaired segment blocks and the second statistical information of the second valid depth values in one of the hole filling segment blocks, the depth optimizing module 145 decides to obtain the optimized depth values by using the first statistical information or the second statistical information. In the example of FIG. 6, for instance, the depth optimizing module 145 performs a statistical operation on the first valid depth values in the to-be-repaired segment block b2 to obtain the first statistical information (e.g., the statistical mean, statistical mode, statistical deviation, or valid value ratio of the first valid depth values in the to-be-repaired segment block b2) of the first valid depth values in the to-be-repaired segment block b2. Moreover, the depth optimizing module 145 performs a statistical operation on the second valid depth values in the hole filling segment block b4 to obtain the second statistical information (e.g., the statistical mean, statistical mode, or statistical deviation of the second valid depth values in the hole filling segment block b4) of the second valid depth values in the hole filling segment block b4.

Thus, in Step S506, the depth optimizing module 145 determines whether the first statistical information of the to-be-repaired segment block and the second statistical information of the hole filling segment block meet a preset condition. When the second valid depth values in the hole filling segment block need to be verified, the aforementioned preset condition is for determining whether to use the first statistical information of the to-be-repaired segment block. In the example of FIG. 6, for instance, the depth optimizing module 145 determines whether the first statistical information of the to-be-repaired segment block b2 and the second statistical information of the hole filling segment block b4 meet the preset condition. If the first statistical information and the second statistical information meet the preset condition (the determining result of Step S506 is YES), in Step S507, the depth optimizing module 145 obtains the optimized depth values by using the first statistical information. If the first statistical information and the second statistical information do not meet the preset condition (the determining result of Step S506 is NO), in Step S508, the depth optimizing module 145 obtains the optimized depth values by using the second statistical information.

In the example of FIG. 6, for instance, when the depth optimizing module 145 obtains the optimized depth values by using the first statistical information, the depth optimizing module 145 sets the statistical mode of the first valid depth values in the to-be-repaired segment block b2 as the optimized depth value. In this way, the depth map generating module 146 fills the statistical mode of the first valid depth values in the to-be-repaired segment block b2 into the hole h2 in the to-be-repaired depth map dm_2 to obtain the optimized depth map, or replaces the second valid depth value dp_3 of the hole-filled depth map dm_3 with the statistical mode of the first valid depth values in the to-be-repaired segment block b2 to obtain the optimized depth map. When the depth optimizing module 145 obtains the optimized depth values by using the second statistical information, the depth optimizing module 145 sets the statistical mode of the second valid depth values in the hole filling segment block b4 as the optimized depth value. In this way, the depth map generating module 146 fills the statistical mode of the second valid depth values in the hole filling segment block b4 into the hole h2 of the to-be-repaired depth map dm_2 to obtain the optimized depth map, or replaces the second valid depth value dp_3 of the hole-filled depth map dm_3 with the statistical mode of the second valid depth values in the hole filling segment block b4 to obtain the optimized depth map.

In an embodiment, the preset condition in Step S506 includes that a valid ratio of the first valid depth values in one of the to-be-repaired segment blocks is greater than a valid threshold value, as shown by the conditional expression (1):

$$\text{REF\_Valid\_ratio} > \text{Threshold\_valid} \quad (1)$$

wherein REF_Valid_ratio represents the valid ratio of the first valid depth values in one of the to-be-repaired segment blocks and Threshold_valid represents the valid threshold value. The conditional expression (1) may be used for determining whether the first valid depth values in the to-be-repaired segment block are too small to have regional representation.

In an embodiment, the preset condition in Step S506 includes that the statistical mode of the first valid depth values in one of the to-be-repaired segment blocks is less than the statistical mode of the first valid depth values in one of the hole filling segment blocks, as shown by the conditional expression (2):

$$\text{REF\_mode} < \text{HF\_mode} \quad (2)$$

wherein REF_mode represents the statistical mode of the first valid depth values in one of the to-be-repaired segment blocks and HF_mode represents the statistical mode of the first valid depth values in one of the hole filling segment blocks. Generally, the statistical mode of the to-be-repaired block in the non-textured region is usually less than the statistical mode of the hole filling block. Thus, the conditional expression (2) may be used for determining whether to use the first statistical information or the second statistical information for optimization.

In an embodiment, the preset condition in Step S506 includes that the statistical standard deviation of the first valid depth values in one of the to-be-repaired segment blocks is less than the statistical standard deviation of the second valid depth values in one of the hole filling segment blocks, as shown by the conditional expression (3):

$$REF\_deviation < HF\_deviation \quad (3)$$

wherein REF_deviation represents the statistical standard deviation of the first valid depth values in one of the to-be-repaired segment blocks and HF_deviation represents the statistical standard deviation of the second valid depth values in one of the hole filling segment blocks. The conditional expression (3) may be used for determining whether the first valid depth values in the to-be-repaired segment block have too much noise interference, which results in an excessively large standard deviation.

On the other hand, if the second valid depth values in one of the hole filling segment blocks do not need to be verified (the determining result of Step S505 is NO), it indicates that the second valid depth values of the hole filling block are nearly consistent. However, since the large hole filling block is a combination of the small superpixel blocks, the object depth and the background depth that have different depth values may be divided into the same hole filling block for the pixel values of the corresponding pixel points are close. In such a case, it is necessary to decide to generate the optimized depth values by using the large hole filling block or the small superpixel block. Thus, if the determining result of Step S505 is YES, in Step S509, the depth optimizing module 145 divides the hole-filled depth map dm_3 into a plurality of superpixel blocks according to the range divided by the superpixels. In other words, based on the range divided by each superpixel on the superpixel map SP_1, the hole-filled depth map dm_3 is divided into a plurality of superpixel blocks. Each superpixel block includes a plurality of second valid depth values. In the example of FIG. 6, for instance, the hole-filled depth map dm_3 is divided into the corresponding superpixel blocks (e.g., superpixel blocks b5, b6, and b7) based on the superpixels (e.g., superpixels S7, S8, and S9) of the superpixel map SP_1.

Then, if the second valid depth values in one of the hole filling segment blocks do not need to be verified (the determining result of Step S505 is NO), according to the third statistical information of the second valid depth values in one of the superpixel blocks of one of the hole filling segment blocks, the depth optimizing module 145 determines to obtain the optimized depth values by using the second statistical information or the third statistical information. In the example of FIG. 6, for instance, the depth optimizing module 145 performs a statistical operation on the second valid depth values in the superpixel block b6 to obtain the third statistical information (e.g., the statistical mean, statistical mode, statistical deviation, and so on of the second valid depth values in the superpixel block b6) of the second valid depth values in the superpixel block b6.

Thus, in Step S510, the depth optimizing module 145 determines whether the second statistical information of the hole filling segment block and the third statistical information of the superpixel block meet a preset condition. In the example of FIG. 6, for instance, it is assumed that the second valid depth values in the hole filling segment block b4 do not need to be verified, and the depth optimizing module 145 generates the optimized depth values by using the second valid depth values in the hole filling segment block b4. The depth optimizing module 145 determines whether the second statistical information of the hole filling segment block b4 and the third statistical information of the superpixel block b6 meet the preset condition. If the third statistical information meets the preset condition (the determining result of Step S510 is YES), in Step S512, the depth optimizing module 145 obtains the optimized depth values by using the third statistical information. If the third statistical information does not meet the preset condition (the determining result of Step S510 is NO), in Step S511, the depth optimizing module 145 obtains the optimized depth values by using the second statistical information.

In the example of FIG. 6, for instance, when the depth optimizing module 145 obtains the optimized depth values by using the second statistical information, the depth optimizing module 145 sets the statistical mode of the second valid depth values in the hole filling segment block b4 as the optimized depth value. In this way, the depth map generating module 146 fills the statistical mode of the second valid depth values in the hole filling segment block b4 into the hole h3 of the to-be-repaired depth map dm_2 to obtain the optimized depth map, or replaces the second valid depth value dp_4 of the hole-filled depth map dm_3 with the statistical mode of the second valid depth values in the hole filling segment block b4 to obtain the optimized depth map. When the depth optimizing module 145 obtains the optimized depth values by using the third statistical information, the depth optimizing module 145 sets the statistical mode of the second valid depth values in the superpixel block b7 as the optimized depth value. In this way, the depth map generating module 146 fills the statistical mode of the second valid depth values in the superpixel block b7 into the hole h3 of the to-be-repaired depth map dm_2 to obtain the optimized depth map, or replaces the second valid depth value dp_4 of the hole-filled depth map dm_3 with the statistical mode of the second valid depth values in the superpixel block b7 to obtain the optimized depth map.

In an embodiment, the preset condition in Step S510 includes whether a difference between the statistical mode of the second valid depth values in one of the superpixel blocks and the statistical mean of the second valid depth values in one of the superpixel blocks is less than a first threshold value, as shown by the conditional expression (4):

$$|HF\_Superpixel\_mode - HF\_Superpixel\_mean| < Threshold\_1 \quad (4)$$

wherein HF_Superpixel mode represents the statistical mode of the second valid depth values in one of the superpixel blocks, HF_Superpixel_mean represents the statistical mean of the second valid depth values in one of the superpixel blocks, and Threshold_1 represents the first threshold value. The conditional expression (4) may be used for determining whether the distribution of the second valid depth values in the superpixel block is nearly consistent, so as to decide whether the second valid depth values in the superpixel block are reliable.

In an embodiment, the preset condition in Step S510 includes whether the statistical standard deviation of the second valid depth values in one of the superpixel blocks is less than a second threshold value, as shown by the conditional expression (5):

$$HF\_Superpixel\_deviation < Threshold\_2 \quad (5)$$

wherein HF_Superpixel deviation represents the statistical standard deviation of the second valid depth values in one of the superpixel blocks and Threshold_2 represents the second threshold value. The conditional expression (5) may be used for determining whether the distribution of the second valid depth values in the superpixel block is nearly consistent, so as to decide whether the second valid depth values in the superpixel block are reliable.

In an embodiment, the preset condition in Step S510 includes whether a difference between the statistical mode of the second valid depth values in one of the superpixel blocks and the statistical mode of the second valid depth values in one of the hole filling segment blocks is greater than a third threshold value, as shown by the conditional expression (6):

$$|HF\_Superpixel\_mode - HF\_mode| > Threshold\_3 \qquad (6)$$

wherein HF_Superpixel mode represents the statistical mode of the second valid depth values in one of the superpixel blocks, HF_mode represents the statistical mode of the first valid depth values in one of the hole filling segment blocks, and Threshold_3 represents the third threshold value. To be more specific, when the depth value of the foreground object is divided into the depth block that represents the background object, since there is a large difference between the depth values of the foreground object and the background, whether the second valid depth values in the superpixel block corresponding to the foreground object are erroneously divided into the hole filling block corresponding to the background may be decided by comparing the mode information of the large hole filling block and the mode information of the small superpixel block. The conditional expression (6) may be used for determining whether the difference between the mode information of the hole filling block and the mode information of the superpixel block is large enough, so as to decide to generate the optimized depth value by using the second valid depth values in the large hole filling block or the second valid depth values in the small superpixel block.

To sum up, in the embodiments of the invention, the statistical information on the to-be-repaired depth map and the hole-filled depth map is used for generating the optimized depth map that has higher accuracy. Further, according to the invention, the pixels of the left image or the right image are grouped first based on the original image information to obtain multiple superpixels and multiple image segments, and then the to-be-repaired segment blocks of the to-be-repaired depth map and the hole filling segment blocks of the hole-filled depth map are decided by using the image segments. In this way, the non-textured region of the original left image can be identified according to the statistical information of the first valid depth values in each to-be-repaired segment block. Then, through interactive analysis of the statistical information of the depth information in the to-be-repaired segment blocks, the statistical information of the depth information in the hole filling segment blocks, and the statistical information of the depth information in the superpixel blocks, reliable optimized depth values are generated for the non-textured region, so as to prevent a difference deviation that occurs when the hole filling process is performed simply based on small-range neighboring information.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An optimization method of image depth information, adapted for an image processing apparatus, the optimization method comprising:

obtaining a to-be-repaired depth map generated based on a left image and a right image, wherein the to-be-repaired depth map records a plurality of first valid depth values and a plurality of holes, wherein the plurality of holes are corresponding to a plurality of invalid depth values and distributed over the to-be-repaired depth map;

performing a superpixel segmenting process on one of the left image and the right image to obtain a plurality of superpixels of one of the left image and the right image;

aggregating the superpixels according to pixel information in the superpixels to obtain a plurality of image segments;

performing a hole filling process on the holes in the to-be-repaired depth map to obtain a hole-filled depth map that comprises a plurality of second valid depth values;

using a range divided by the image segments, a range divided by the superpixels, the to-be-repaired depth map, and the hole-filled depth map to perform a statistical analysis on the first valid depth values of the to-be-repaired depth map and the second valid depth values of the hole-filled depth map, so as to obtain a plurality of optimized depth values; and obtaining an optimized depth map according to the optimized depth values.

2. The optimization method according to claim 1, wherein one of the left image and the right image comprises a plurality of pixels, and the pixels are segmented into the superpixels according to a pixel value and a pixel location of the pixels.

3. The optimization method according to claim 1, wherein the step of aggregating the superpixels according to the pixel information in the superpixels to obtain the image segments comprises:

collecting statistics of histogram information of each of the superpixels; and combining the superpixels according to the histogram information of each of the superpixels to form the image segments.

4. The optimization method according to claim 1, wherein the step of aggregating the superpixels according to the pixel information in the superpixels to obtain the image segments comprises:

performing edge detection on the superpixels to obtain an edge characteristic of each of the superpixels; and combining the superpixels according to the edge characteristic of each of the superpixels to form the image segments.

5. The optimization method according to claim 1, wherein the step of using the range divided by the image segments, the range divided by the superpixels, the to-be-repaired depth map, and the hole-filled depth map to perform the statistical analysis on the first valid depth values of the to-be-repaired depth map and the second valid depth values of the hole-filled depth map, so as to obtain the optimized depth values comprises:

dividing the to-be-repaired depth map into a plurality of to-be-repaired segment blocks by using the range divided by the image segments;

determining whether any one of the to-be-repaired segment blocks is a block to be optimized based on its size and the numbers of the first valid depth values and the invalid depth values included therein; and if one of the to-be-repaired segment blocks is the block to be optimized, then generating the optimized depth values for the holes in the one of the to-be-repaired segment blocks.

6. The optimization method according to claim 5, wherein the step of determining whether any one of the to-be-repaired segment blocks is the block to be optimized based on its size and the numbers of the first valid depth values and the invalid depth values included therein comprises:

determining that the one of the to-be-repaired segment blocks is an unreliable region if the size of the one of the to-be-repaired segment blocks is greater than a block threshold value and the number of the invalid depth values in the one of the to-be-repaired segment blocks is greater than a product of the number of the first valid depth values multiplied by a weighting factor.

7. The optimization method according to claim 1, wherein the step of using the range divided by the image segments, the range divided by the superpixels, the to-be-repaired depth map, and the hole-filled depth map to perform the statistical analysis on the first valid depth values of the to-be-repaired depth map and the second valid depth values of the hole-filled depth map, so as to obtain the optimized depth values comprises:

dividing the hole-filled depth map into a plurality of hole filling segment blocks by using the ranges divided by the image segments; and deciding whether the second valid depth values in one of the hole filling segment blocks of the hole-filled depth map need to be verified according to a statistical value of the second valid depth values in the one of the hole filling segment blocks.

8. The optimization method according to claim 7, wherein the step of using the range divided by the image segments, the range divided by using the superpixels, the to-be-repaired depth map, and the hole-filled depth map to perform the statistical analysis on the first valid depth values of the to-be-repaired depth map and the second valid depth values of the hole-filled depth map, so as to obtain the optimized depth values comprises:

dividing the to-be-repaired depth map into a plurality of to-be-repaired segment blocks by using the range divided by the image segments; and if the second valid depth values in the one of the hole filling segment blocks need to be verified, then obtaining the optimized depth values by using the first statistical information of the first valid depth values in one of the to-be-repaired segment blocks or second statistical information of the second valid depth values in the one of the hole filling segment blocks depending on the first statistical information and the second statistical information.

9. The optimization method according to claim 8, wherein the step of obtaining the optimized depth values by using the first statistical information of the first valid depth values in the one of the to-be-repaired segment blocks or the second statistical information of the second valid depth values in the one of the hole filling segment blocks depending on the first statistical information and the second statistical information comprises:

obtaining the optimized depth values by using the first statistical information if the first statistical information and the second statistical information meet a preset condition; and obtaining the optimized depth values by using the second statistical information if the first statistical information and the second statistical information do not meet the preset condition.

10. The optimization method according to claim 9, wherein the preset condition comprises that a valid ratio of the first valid depth values in the one of the to-be-repaired segment blocks is greater than a valid threshold value, that a statistical mode of the first valid depth values in the one of the to-be-repaired segment blocks is less than a statistical mode of the second valid depth values in the one of the hole filling segment blocks, and that a statistical standard deviation of the first valid depth values in the one of the to-be-repaired segment blocks is less than a statistical standard deviation of the second valid depth values in the one of the hole filling segment blocks.

11. The optimization method according to claim 7, wherein the step of performing the statistical analysis on the first valid depth values of the to-be-repaired depth map and the second valid depth values of the hole-filled depth map by the range divided by using the image segments, the range divided by the superpixels, the to-be-repaired depth map, and the hole-filled depth map to obtain the optimized depth values comprises:

dividing the hole-filled depth map into a plurality of superpixel blocks by the range divided by using the superpixels; and if the second valid depth values in the one of the hole filling segment blocks do not need to be verified, then obtaining the optimized depth values by using the second statistical information or the third statistical information based on third statistical information of the second valid depth values in one of the superpixel blocks in the one of the hole filling segment blocks.

12. The optimization method according to claim 11, wherein the step of obtaining optimized depth values by using the second statistical information or the third statistical information based on third statistical information of the second valid depth values in one of the superpixel blocks in the one of the hole filling segment blocks comprises:

obtaining the optimized depth values by using the third statistical information if the third statistical information meets a preset condition; and obtaining the optimized depth values by using the second statistical information if the third statistical information does not meet the preset condition.

13. The optimization method according to claim 12, wherein the preset condition comprises whether a difference between a statistical mode of the second valid depth values in the one of the superpixel blocks and a statistical mean of the second valid depth values in the one of the superpixel blocks is less than a first threshold value; whether a statistical standard deviation of the second valid depth values in the one of the superpixel blocks is less than a second threshold value; and whether a difference between the statistical mode of the second valid depth values in the one of the superpixel blocks and the statistical mode of the second valid depth values in the one of the hole filling segment blocks is greater than a third threshold value.

14. An image processing apparatus, comprising:
a storage device storing a plurality of modules; and
a processor or more coupled to the storage device and accessing and executing the modules recorded in the storage device, wherein the modules comprise:
a to-be-repaired depth map obtaining module obtaining a to-be-repaired depth map generated based on a left image and a right image, wherein the to-be-repaired depth map records a plurality of first valid depth values and a plurality of holes, wherein the plurality of holes are corresponding to a plurality of invalid depth values and distributed over the to-be-repaired depth map;
a superpixel segmenting module performing a superpixel segmenting process on one of the left image and the right image to obtain a plurality of superpixels of one of the left image and the right image;

an image segmenting module aggregating the superpixels according to pixel information in the superpixels to obtain a plurality of image segments;

a hole filling module performing a hole filling process on the holes in the to-be-repaired depth map to obtain a hole-filled depth map that comprises a plurality of second valid depth values;

a depth optimizing module using a range divided the image segments, a range divided by the superpixels, the to-be-repaired depth map, and the hole-filled depth map to perform a statistical analysis on the first valid depth values of the to-be-repaired depth map and the second valid depth values of the hole-filled depth map, so as to obtain a plurality of optimized depth values; and a depth map generating module obtaining an optimized depth map according to the optimized depth values.

15. The image processing apparatus according to claim 14, wherein one of the left image and the right image comprises a plurality of pixels, and the pixels are segmented into the superpixels according to a pixel value and a pixel location of the pixels.

16. The image processing apparatus according to claim 14, wherein the image segmenting module collects statistics of histogram information of each of the superpixels and combines the superpixels according to the histogram information of each of the superpixels to form the image segments.

17. The image processing apparatus according to claim 14, wherein the image segmenting module performs edge detection on the superpixels to obtain an edge characteristic of each of the superpixels and combines the superpixels according to the edge characteristic of each of the superpixels to form the image segments.

18. The image processing apparatus according to claim 14, wherein the depth optimizing module divides the to-be-repaired depth map into a plurality of to-be-repaired segment blocks by using the range divided by the image segments, and determines whether any one of the to-be-repaired segment blocks is a block be optimized based on its size and the numbers of the first valid depth values and of the invalid depth values included therein, wherein if one of the to-be-repaired segment blocks is the block to be optimized, the depth optimizing module then generates the optimized depth values for the holes in the one of the to-be-repaired segment blocks.

19. The image processing apparatus according to claim 18, wherein the depth optimizing module determines that the one of the to-be-repaired segment blocks is the block to be optimized if the size of the one of the to-be-repaired segment blocks is greater than a block threshold value and the number of the invalid depth values in the one of the to-be-repaired segment blocks is greater than a product of the number of the first valid depth values multiplied by a weighting factor.

20. The image processing apparatus according to claim 14, wherein the depth optimizing module divides the hole-filled depth map into a plurality of hole filling segment blocks by using the range divided by the image segments, and decides whether the second valid depth values in one of the hole filling segment blocks of the hole-filled depth map need to be verified according to a statistical value of the second valid depth values in the one of the hole filling segment blocks.

21. The image processing apparatus according to claim 20, wherein the depth optimizing module divides the to-be-repaired depth map into a plurality of to-be-repaired segment blocks by using the range divided by the image segments, wherein if the second valid depth values in the one of the hole filling segment blocks need to be verified, then the depth optimizing module obtains optimized depth values by using the first statistical information of the first valid depth values in one of the to-be-repaired segment blocks or second statistical information of the second valid depth values in the one of the hole filling segment blocks depending on the first statistical information and the second statistical information.

22. The image processing apparatus according to claim 21, wherein the depth optimizing module obtains the optimized depth values by using the first statistical information if the first statistical information and the second statistical information meet a preset condition; and the depth optimizing module obtains the optimized depth values by using the second statistical information if the first statistical information and the second statistical information do not meet the preset condition.

23. The image processing apparatus according to claim 22, wherein the preset condition comprises that a valid ratio of the first valid depth values in the one of the to-be-repaired segment blocks is greater than a valid threshold value, that a statistical mode of the first valid depth values in the one of the to-be-repaired segment blocks is less than a statistical mode of the second valid depth values in the one of the hole filling segment blocks, and that a statistical standard deviation of the first valid depth values in the one of the to-be-repaired segment blocks is less than a statistical standard deviation of the second valid depth values in the one of the hole filling segment blocks.

24. The image processing apparatus according to claim 20, wherein the depth optimizing module divides the hole-filled depth map into a plurality of superpixel blocks by the range divided by the superpixels, wherein if the second valid depth values in the one of the hole filling segment blocks do not need to be verified, then the depth optimizing module obtains the optimized depth values by using the second statistical information or the third statistical information based on third statistical information of the second valid depth values in one of the superpixel blocks in the one of the hole filling segment blocks.

25. The image processing apparatus according to claim 24, wherein the depth optimizing module obtains the optimized depth values by using the third statistical information if the third statistical information meets a preset condition; and the depth optimizing module obtains the optimized depth values by using the second statistical information if the third statistical information does not meet the preset condition.

26. The image processing apparatus according to claim 25, wherein the preset condition comprises whether a difference between a statistical mode of the second valid depth values in the one of the superpixel blocks and a statistical mean of the second valid depth values in the one of the superpixel blocks is less than a first threshold value; whether a statistical standard deviation of the second valid depth values in the one of the superpixel blocks is less than a second threshold value; and whether a difference between the statistical mode of the second valid depth values in the one of the superpixel blocks and the statistical mode of the second valid depth values in the one of the hole filling segment blocks is greater than a third threshold value.

* * * * *